United States Patent [19]
Essenpreis et al.

[11] 3,852,960
[45] Dec. 10, 1974

[54] PORTABLE WASTE DISPOSAL SYSTEM HAVING AUTOMATIC CONTROL MEANS

[75] Inventors: Philip A. Essenpreis, 805 Florida Ave., Cocoa, Fla. 32933; Wayne Morehouse, Merritt Island, Fla.

[73] Assignee: said Essenpreis, by said Morehouse

[22] Filed: July 11, 1972

[21] Appl. No.: 270,602

[52] U.S. Cl. .................. 60/317, 123/1 A, 210/152, 60/317
[51] Int. Cl. ......... F01n 3/02, B01d 3/00, C02c 3/00
[58] Field of Search ...... 210/152; 110/131; 123/1 A

[56] References Cited
UNITED STATES PATENTS

| | | | |
|---|---|---|---|
| 2,565,720 | 8/1951 | Collison | 4/131 |
| 3,612,278 | 10/1971 | Dieterich | 210/152 |
| 3,616,913 | 11/1971 | Reid | 210/152 |
| 3,633,746 | 1/1972 | Dieterich | 210/152 |
| 3,731,490 | 5/1973 | Sargent | 60/317 |
| 3,775,978 | 12/1973 | Body | 60/317 |

Primary Examiner—Charles J. Myhre
Assistant Examiner—Ronald B. Cox
Attorney, Agent, or Firm—Duckworth, Hobby & Allen

[57] ABSTRACT

A waste disposal system for a combustion engine-powered vehicle includes means for sensing the temperature and speed of the engine and the level of waste in a holding tank. The system is activated only upon coincidence of predetermined inputs from the sensing means, to deliver the waste to an exhaust portion of the engine. Operation of the system is automatically prevented during the absence of any one of the predetermined inputs.

13 Claims, 2 Drawing Figures

PORTABLE WASTE DISPOSAL SYSTEM HAVING AUTOMATIC CONTROL MEANS

BACKGROUND OF THE INVENTION

1. Field of the Invention

The present invention relates to portable waste disposal systems, and in particular relates to means for controlling such systems.

2. Description of the Prior Art

Portable waste disposal systems have been designed for use on recreational vehicles, buses, boats, and the like. Some of these systems are capable of disposing of the collected waste, by injecting the waste into the extremely hot exhaust gases of the vehicle's combustion engine.

More specifically, the waste is retained in a holding tank in the vehicle. When the vehicle's engine is at normal operating temperatures and is being driven at a sufficient speed, the waste is pumped into the exhaust system near the manifold of the engine. The extremely hot exhaust gases break down and destroy the waste and render it harmless as it exits the vehicle.

Generally, these disposal systems include a control unit which is operated by the driver. Sensors at the appropriate locations in the system activate lights on the control unit which indicate to the driver when the holding tank is full, and when the engine is at a normal operating temperature and is moving at a sufficient speed. The driver then switches on a pump in the system, which delivers the waste to the engine exhaust for disposal.

There are some difficulties associated with the control units just described for such portable disposal systems. For example, the driver of the vehicle often cannot continously monitor the control unit to determine when the holding tank has been evacuated. Thus the pump may be damaged by permitting it to run too long.

More importantly, the engine temperature or speed lights may be extinguished without being observed by the driver. Thus the system may continue to deliver waste to the engine exhaust, while the engine is either too cold or moving too slow to insure complete disposal of the waste in the exhaust. As a result, the unburned waste may pass out of the vehicle exhaust creating air pollution and a potential health hazard.

SUMMARY OF THE INVENTION

The present invention comprises a waste disposal system for a combustion engine powered vehicle. The system comprises means for retaining waste, means for exhausting hot gases from the engine, and means for delivering waste from the retaining means to the exhausting means. Means are provided for sensing the level of waste in the retaining means, and for sensing the temperature and speed of the engine.

Means are also provided for activating the delivery means only upon coincidence of predetermined inputs from the sensing means.

THE DRAWING

DETAILED DESCRIPTION

An embodiment of the system of the present invention will be described with reference to FIG. 1, which illustrates the various components of the system by block diagrams. An embodiment of an electronic control unit for the system shown as a component in FIG. 1, will thereafter be described in greater detail with reference to FIG. 2.

Figure 1:
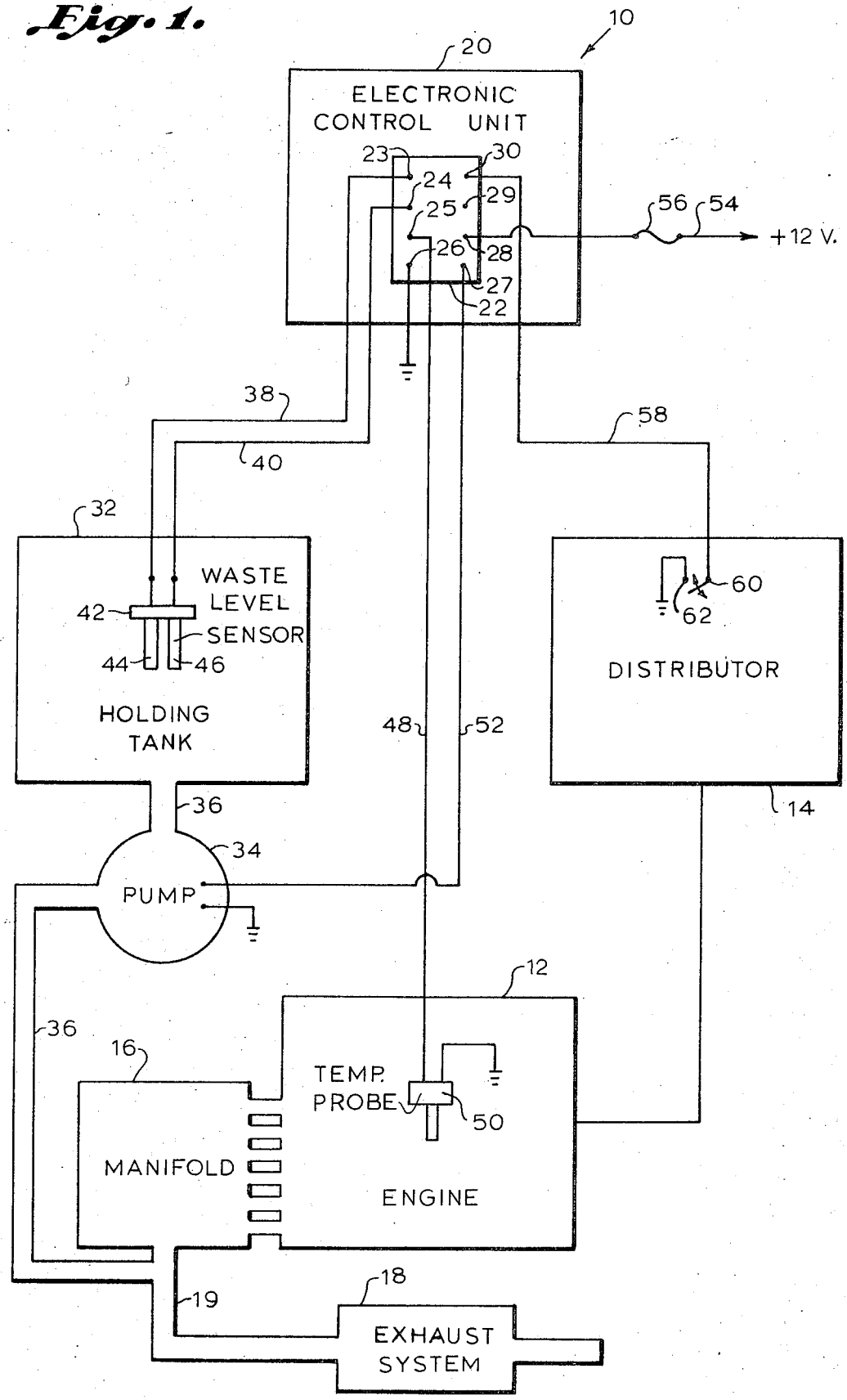
FIG. 1 is a block diagram of the system of the present invention.

The portable waste disposal system is referred to generally as 10 in FIG. 1. The system 10 is associated with a combustion engine powered vehicle, such as a bus, boat, or "recreational vehicle," a term intended to include self propelled and towed campers, trailers, and the like. The vehicle comprises an engine 12 and a distributor 14 associated with the engine for regulating the engine ignition pulses in a well known manner. The vehicle further includes a manifold 16 associated with the engine 12 to collect the extremely hot gases which result from combustion during operation of the engine. An exhaust system 18 is connected to the manifold 16 by means of an exhaust pipe 19 to provide means for cooling and reducing the pollution level of the gases before exiting the vehicle. For purposes of this description, the engine, distributor, manifold and exhaust system 12, 14, 16 and 18 respectively, are a part of the waste disposal system 10.

The system 10 includes a waste holding tank 32, which may, for example, be associated with toilet facilities aboard the vehicle. An electrically operated pump 34 is connected by piping 36 between the holding tank 32 and the exhaust pipe 19 near the manifold 16.

The system 10 further includes an electronic control unit 20. The control unit 20 comprises a terminal panel 22 having a number of terminals, including eight terminals, 23, 24, 25, 26, 27, 28, 29 and 30. The terminals 23–30 are connected to a control circuit arrangement in the control unit 20, an embodiment of which will later be described in detail with reference to FIG. 2.

Some of the terminals 23–30 are also electrically coupled to various other components in the system 10. As shown in FIG. 1, terminals 23 and 24 are electrically coupled by respective wires 38 and 40 to a waste level sensor 42 located within the holding tank 32. The waste level sensor 42 includes two probes 44 and 46, and may comprise any one of a variety of sensors which will conduct current between the two probes (and thus, between terminals 23 and 24) when the waste level in the tank 32 is at, or above, the level of the extremities of the two probes.

Terminal 25 is coupled by a wire 48 to one terminal of a temperature probe 50 located proximal to, and preferably within the engine 12. Terminal 26 and the second terminal of the temperature probe are coupled to ground. The temperature probe 50 may comprise a simple thermal element probe which will decrease in electrical resistnace with increasing temperature.

Terminal 27 is coupled by a wire 52 to one terminal of the pump 34, the other terminal of which is grounded. Terminal 28 is coupled by a wire 54 through a fuse 56 to the positive terminal of a 12 volt DC power supply which may comprise the battery of the vehicle. Terminal 30 is coupled by a wire 58 to a postive terminal 60 of the points in the distributor 14, the other terminal 62 of which is grounded.

The system 10 functions in the following manner. When the level of waste in the holding tank 32 is at, or above, the extremities of the two probes 44 and 46 of the waste level sensor 42, current is conducted between terminals 23 and 24 of the control unit 20. Further, after the engine 12 is started, the engine begins to warm up to a normal operating temperature; for increasing temperatures, the temperature probe 50 conducts increasingly large current levels between terminal 25 and ground. As the speed of the engine 12 is increased to a normal speed, the distributor points will rapidly open and close, the frequency and increasing DC level of which is conducted between terminals 30 and ground. When the temperature sensor 50, the distributor 14, and the waste level sensor 42 each provide a predetermined input to the control unit 20, the control unit activates the pump 34 which, in turn, delivers the retained waste from the holding tank 32 to the exhaust pipe 19. In the exhaust pipe 19 the waste is burned by the extremely hot exhaust gases (on the order of 1,800°F.) of the engine 12, and is then passed out of the vehicle via the exhaust system 18.

With respect to the waste level sensor 42, the term "predetermined input" is intended to mean an input from the waste level sensor 42 when the amount of waste in the holding tank 32 is sufficient to require removal, as for example, when the waste level is at or above the extremities of the two probes 44 and 46 of the sensor 42. With respect to the temperature probe 50 and the distributor 14, the term "predetermined input" is intended to mean an input from those respective sensors when the engine 12 is operating at, or above a temperature and a speed which is predetermined by calibration of the circuit arrangement in the control unit 20, as hereinafter described.

EXAMPLE

Figure 2:
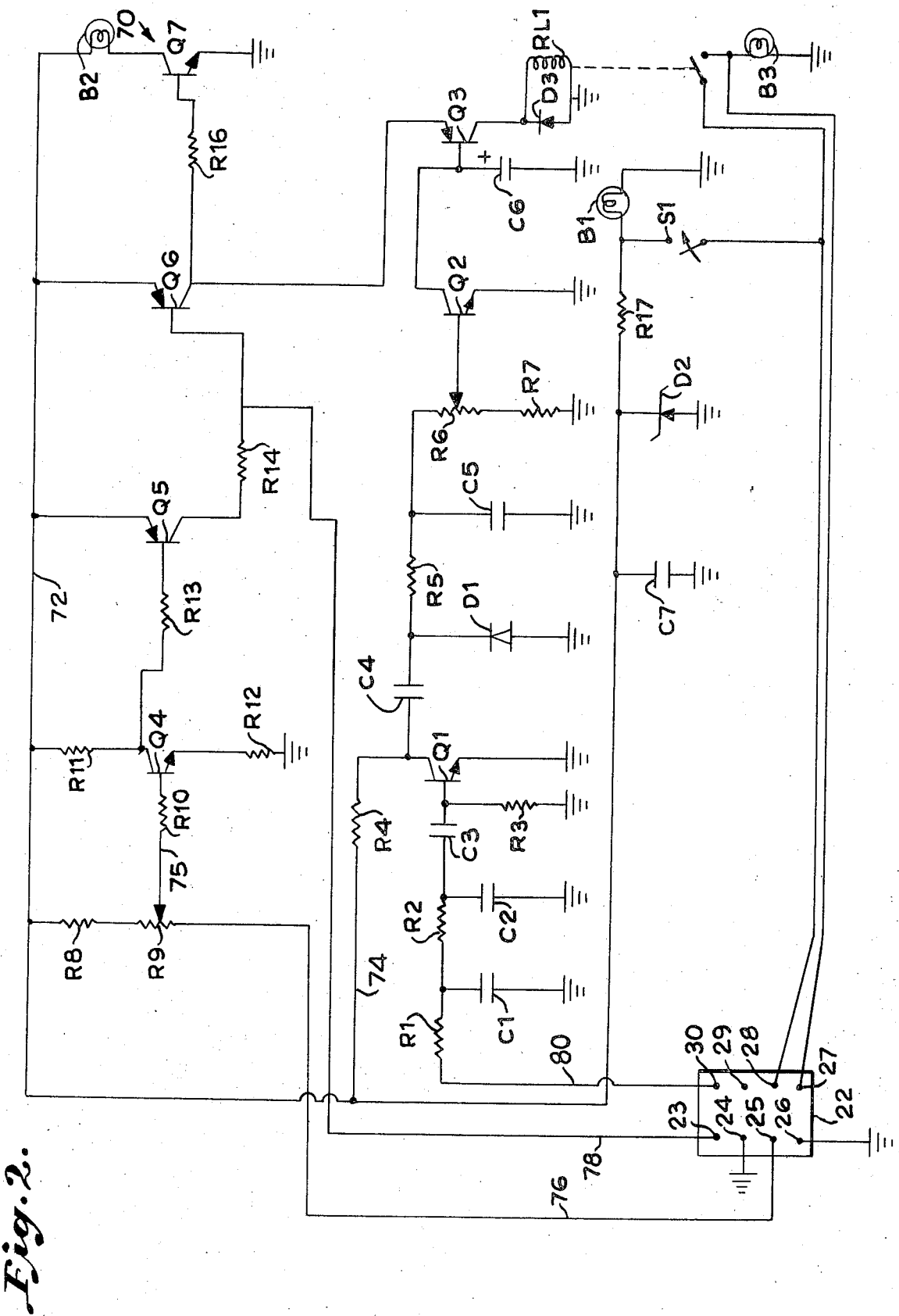
FIG. 2 is a schematic diagram of an electronic circuit embodying a part of the system of FIG. 1.

An example of a circuit arrangement capable of performing the functions of the control unit 20 is shown in FIG. 2. The circuit, referred to generally as 70, comprises a variety of active and passive circuit elements, which include resistors (R), capacitors (C), diodes (D), transistors (Q), and one relay (RL), each of which is identified by an appropriate upper-case letter followed by a numeral, in a manner well-known in the electronics art. While various modifications and arrangements of the circuit 70 are possible, the following materials list of circuit element values has been employed in performing the desired control circuit function:

R1: 2.7 kohm, ¼ watt
R2, R3, R4, R10: 4.7 kohm, ¼ watt
R5: 1.2 kohm, ¼ watt
R6: 0–1.0 kohm potentiometer
R7, R14: 330 ohm, ¼ watt
R8, R11: 2.2 kohm, ¼ watt
R9: 0–100 ohm potentiometer
K12: 100 ohm, ¼ watt
R13, R15, R16: 10 kohm, ¼ watt
R17: 10 ohm, ½ watt
C1, C4: 0.2 microfarad, 16 volt
C2, C3: 0.1 microfarad, 16 volt
C5: 1 microfarad, 16 volt
C6: 20 microfarad, 16 volt
D1: IN34
D2: IN4742, 12 volt, 1 watt Zener
D3: IN4004
Q1, Q2, Q4, Q7: 2N3643 or equivalent NPN
Q3, Q5, Q6: 2N3638 or equivalent PNP It will be noted that resistors R6 and R9 are potentiometers capable of being calibrated within the limits specified above. Potentiometer R6 provides speed calibration means for selecting the predetermined speed input from the distributor 14 necessary for operation of the waste disposal system 10. For example, an engine speed of 3,200 R.P.M. has been found suitable. In a like manner, potentiometer R9 provides engine temperature calibration means for selecting the predetermined engine temperature input from the probe 50 for operation of the system 10. Suitably, the potentiometer R9 is calibrated to an input occurring when an engine temperature of 120°F., of above, is sensed by the temperature probe 50.

Generally the circuit 70 does not activate the pump 34 unless and until three conditions are satisfied. These conditions are the predetermined inputs from the temperature probe 50, the distributor 14 and the waste level sensor 42. This is accomplished in the following manner.

The circuit 70 is initially energized by closing an on-off switch S1. It will be understood that closing of the switch S1 does not activate the pump 34, absent the three predetermined inputs discussed above. Switch S1 provides 12 volt B+ supply through terminals 28 from the +12 volt supply of the circuit. A bulb B1 indicates when switch S1 is in the "on" position. A Zener diode D2 and a capacitor C7 regulate a constant +12 volt bias to bus lines 72 and 74.

Initially, transistors Q4 and Q5 are biased into conduction. As the engine temperature rises, the resistance of the temperature probe 50 decreases causing increased current-flow through potentiometer R9 via a circuit line 76 connected to terminal 25. The calibration terminal 75 of potentiometer R9 is coupled to the base terminal of transistor Q4. When this current-flow reaches a level predetermined by the calibration of potentiometer R9, the base-emitter junction of transistor Q4 is de-biased, causing transistor Q4 to turn off. The collector terminal of transistor Q4 is coupled to the base of transistor Q5. When transistor Q4 turns off, +12 volts appears on the emitter-base junction of transistor Q5, causing Q5 to turn off.

When transistor Q5 is initially conducting, +12 volt appears across the emitter-base junction of transistor Q6, causing Q6 to be initially non-conducting. The collector of transistor Q5 is coupled to the base of transistor Q6. When transistor Q5 turns off, all of the bias is removed from the emitter-base junction of transistor Q6, and Q6 remains non-conducting. However, when a current-flow occurs between probes 44 and 46 of the waste level sensor 42, current also flows between terminals 23 and 24 along circuit line 78, which is likewise coupled to the base terminal of transistor Q6. This, in turn, biases the emitter-base junction of transistor Q6 into conduction. Reiterating, transistor Q6 conducts only when the predetermined temperature input turns transistor Q5 off, and the waste level sensor 42 causes current to flow between terminals 23 and 24 and into the base of transistor Q6.

The collector of transistor Q6 is coupled to the emitter of transistor Q3. When transistor Q6 is conducting, +12 volts is applied to the emitter of transistor Q3; further, +12 volts is supplied to resistor R16, causing transistor Q7 to turn on. Transistor Q7 is a lamp driver which turns on an amber "ready" bulb B2, indicating that the engine 12 is at a sufficient temperature and the waste level is in the holding tank 32 is sufficient to allow disposal.

Noting the central portion of the schematic of FIG. 2, transistor Q1, resistors R1, R2 and R4 and capacitors C1, C2 and C3 comprise a wave-shaping and amplification circuit which receives, conditions and amplifies the ignition pulse signals from the points of the distributor 14 via a circuit line 80 and terminal 30. The output of the wave-shaping circuit, including transistor Q1, is coupled through capacitor C4, rectified to a DC level by diode D1, and thereafter filtered in an RC circuit including resistor R5 and capacitor C5. Since the output of the distributor is an increasing ramp function versus increasing engine revolutions, then the rectified signal increases in D.C. level with increases in engine speed.

Potentiometer R6 controls the bias level of transistor Q2. The calibration terminal of potentiometer R6 is coupled to the base of transistor Q2. As the speed in the engine increases, the voltage across resistor R6 increases until the predetermined level is achieved, at which point transistor Q2 conducts. The collector of transistor Q2 is coupled to the base of transistor Q3. When transistor Q2 conducts, transistor Q3 also goes into conduction, but only if 30 12 volts is applied to the emitter of transistor Q3 from transistor Q6, as previously described. When this occurs, all three of the above described conditions are met and current flows through transistor Q3 to energize relay RL1. With relay RL1 closed, +12 volts are supplied to the pump 34 via terminal 27. A bulb B3 in series with the pump indicates when the pump 34 is operating. Upon activation, the pump 34 delivers waste from the holding tank 32 to the exhaust pipe 19 until one or more of the three predetermined inputs ae no longer present, in which case relay RL1 is de-energized and further operation of the pump 34 is prevented.

The circuit 70 has been described as employing bipolar transistors as active circuit elements. However, it will be appreciated by those skilled in the art that other active circuit elements, such as field effect devices and vacuum tubes, may be used. In any case a three-terminal active circuit element is employed, which includes two terminals and a terminal capable of controlling current flow therebetween. Such devices are capable of either switching or amplification operation.

An important aspect of the present invention is the manner in which the electronic control unit 20 automatically controls disposal of waste, without manual control. Since the control unit 20 will not activate the pump 34 absent one of the three above described inputs, then the system 10 may be left switched on without distracting or causing concern to the driver of the vehicle.

We claim:

1. A waste disposal system for a vehicle powered by a combustion engine, comprising:
    means for retaining waste;
    means for exhausting hot gases from said engine;
    means for delivering waste from said retaining means into said exhausting means;
    means for sensing the level of waste in said retaining means;
    means for sensing the temperature of said engine;
    means for electronically sensing the speed of said engine;
    means for activating said delivery means only upon coincidence of predetermined inputs thereto from said waste level, temperature and speed sensing means; and wherein
    said predetermined inputs are representative, respectively, of the presence of waste in said retaining means, and sufficient engine temperature and speed to achieve burning of said waste.

2. A system as recited in claim 1 wherein said waste level sensing means comprises a sensor having two probes, said two probes adapted to conduct current through waste therebetween.

3. A system as recited in claim 1 wherein said temperature sensing means comprises a temperature probe extending into said engine, said probe adapted to decrease in electrical resistance for increases in the temperature of said engine.

4. A system as recited in claim 1 wherein said vehicle further comprises a distributor associated with said engine for providing ignition pulses thereto, and wherein said speed sensing means comprises means for sensing said ignition pulses.

5. A system as recited in claim 1 wherein said activating means comprises:
    a first active circuit element having first and second terminals and a terminal capable of controlling current flow between said first and second terminals;
    means coupled to said second terminal for switching on said delivery means during current flow between said first and second terminals;
    means coupled to said control terminal for providing a bias thereto during incidence of said predetermined input from said speed sensing means;
    means coupled to said terminal for providing a bias thereto, during incidence of said predetermined inputs from said waste level and temperature sensing means; and wherein
    said sensing means control said circuit element such that current is conducted between said first and second terminals only during coincidence of said predetermined inputs.

6. A system as recited in claim 5 wherein said bias-providing means coupled to said control terminal comprises:
    a second active circuit element having first, second and control terminals;
    said second terminal of said second circuit element being coupled to said control terminal of said first circuit element;
    means coupled to said control terminal of said second circuit element for biasing said second circuit element into conduction upon the incidence of said predetermined input from said speed sensing means; and wherein
    said first circuit element bias is provided to said first circuit element during conduction of said second circuit element.

7. A system as recited in claim 6 further comprising means coupled to said control terminal of said second circuit element for predetermining the input from said speed sensing means necessary to bias said second circuit element into conduction.

8. A system as recited in claim 7 wherein:
    said first circuit element comprises a PNP bipolar transistor;

said second circuit element comprises an NPN bipolar transistor;

each said bipolar transistor having emitter, base and collector terminals corresponding to said first, control and second terminals, respectively; and wherein said predetermining means comprises a potentiometer having a calibrating terminal coupled to said base terminal corresponding to said control terminal of said second circuit element.

9. A system as recited in claim 5 wherein said bias-providing means coupled to said first terminal of said first circuit element comprises:

a third active circuit element having first, second and control terminals, said second terminal of said third circuit element coupled to said first terminal of said first circuit element; and means coupled to said control terminal of said third circuit element for biasing said third circuit element into conduction upon incidence of said predetermined inputs from said waste level and temperature sensing means.

10. A system as recited in claim 9 wherein said biasing means coupled to said control terminal of said third circuit element comprises:

means directly coupling said control terminal of said third circuit element to waste level sensing means;

a fourth active circuit element having first, second and control terminals, said second terminal of said fourth circuit element coupled terminal of said third circuit element; and wherein said third circuit element is adapted to conduct current between said first and second terminals thereof only upon coincidence of current flow in said direct coupling means and in the absence of current flow between said first and second terminals of said fourth circuit element.

11. A system as recited in claim 10 further comprising means coupled to said control terminal of said fourth circuit element for predetermining the input necessary to bais said fourth circuit element into non-conduction.

12. A system as recited in claim 11 wherein:

said third and fourth circuit elements comprise PNP bipolar transistors each having emitter, base and collector terminals corresponding to said first, control and second terminals, respectively; and wherein said predetermining means comprises a potentiometer having a calibrating terminal coupled to said base terminal corresponding to said control terminal of said fourth circuit element.

13. Control apparatus for a waste disposal system carried by a combustion engine powered vehicle, comprising:

means for receiving an input representative of the temperature of said engine;

means for receiving an input representative of the speed of said engine;

means for receiving an input representative of the level of waste in said system;

means for activating said system only upon coincidence of a predetermined input from said temperature, speed and waste level sensing means; said activating means comprising:

a transistor having emitter, base and collector terminals, a relay coupled to said collector terminal, said speed input receiving means coupled to said base terminal, and said temperature and waste level input receiving means coupled to said emitter terminal.

* * * * *